(12) United States Patent
Headley

(10) Patent No.: US 8,555,066 B2
(45) Date of Patent: Oct. 8, 2013

(54) SYSTEMS AND METHODS FOR CONTROLLING ACCESS TO ENCRYPTED DATA STORED ON A MOBILE DEVICE

(75) Inventor: Paul Headley, Hollister, CA (US)

(73) Assignee: Veritrix, Inc., Palo Alto, CA (US)

( * ) Notice: Subject to any disclaimer, the term of this patent is extended or adjusted under 35 U.S.C. 154(b) by 0 days.

(21) Appl. No.: 13/413,578

(22) Filed: Mar. 6, 2012

(65) Prior Publication Data

US 2012/0166797 A1   Jun. 28, 2012

Related U.S. Application Data

(63) Continuation of application No. 12/166,792, filed on Jul. 2, 2008, now Pat. No. 8,166,297.

(51) Int. Cl.
*H04L 9/00* (2006.01)
*H04L 9/32* (2006.01)

(52) U.S. Cl.
USPC ............................... 713/168; 713/186; 726/2

(58) Field of Classification Search
USPC ......... 380/270; 713/168, 182–186; 726/2–4, 726/16–20
See application file for complete search history.

(56) References Cited

U.S. PATENT DOCUMENTS

| | | |
|---|---|---|
| 5,033,088 A | 7/1991 | Shipman |
| 5,805,674 A | 9/1998 | Anderson, Jr. |
| 5,824,030 A | 10/1998 | Yang et al. |
| 5,841,870 A | 11/1998 | Fieres et al. |
| 5,915,001 A | 6/1999 | Uppaluru |
| 5,958,016 A | 9/1999 | Chang et al. |
| 5,995,928 A | 11/1999 | Nguyen et al. |
| 6,009,442 A | 12/1999 | Chen et al. |
| 6,021,491 A | 2/2000 | Renaud |
| 6,061,651 A | 5/2000 | Nguyen |
| 6,119,087 A | 9/2000 | Kuhn et al. |
| 6,173,266 B1 | 1/2001 | Marx et al. |
| 6,219,793 B1 | 4/2001 | Li et al. |
| 6,233,556 B1 | 5/2001 | Teunen et al. |

(Continued)

FOREIGN PATENT DOCUMENTS

| | | |
|---|---|---|
| CA | 2278549 A1 | 7/1998 |
| CA | 2399961 A1 | 4/1999 |

(Continued)

OTHER PUBLICATIONS

U.S. Appl. No. 12/137,129, Paul Headley, Single-Channel Multi-Factor Authentication, filed Jun. 11, 2008.

(Continued)

*Primary Examiner* — Hosuk Song
(74) *Attorney, Agent, or Firm* — Peters Verny, LLP

(57) ABSTRACT

Encrypted data on mobile devices is protected by remotely storing a decryption key. In order to decrypt the encrypted data on the mobile device, the mobile device obtains the decryption key from an access control system that is remote from the mobile device. The access control system can control access to the encrypted data by controlling access to the decryption key. For example, the access control system can implement user authentication as a condition for providing the decryption key. Access to the encrypted data can also be controlled by withholding the decryption key where, for instance, a mobile device has been reported to be lost or stolen, or once an individual's access privilege has been revoked, or at certain times of the day.

23 Claims, 3 Drawing Sheets

(56) References Cited

U.S. PATENT DOCUMENTS

| | | |
|---|---|---|
| 6,256,630 B1 | 7/2001 | Gilai et al. |
| 6,262,732 B1 | 7/2001 | Coleman et al. |
| 6,266,398 B1 | 7/2001 | Nguyen |
| 6,272,484 B1 | 8/2001 | Martin et al. |
| 6,292,767 B1 | 9/2001 | Jackson et al. |
| 6,389,394 B1 | 5/2002 | Fanty |
| 6,393,399 B1 | 5/2002 | Even |
| 6,400,806 B1 | 6/2002 | Uppaluru |
| 6,405,170 B1 | 6/2002 | Phillips et al. |
| 6,424,943 B1 | 7/2002 | Sherwood et al. |
| 6,434,521 B1 | 8/2002 | Barnard |
| 6,434,523 B1 | 8/2002 | Monaco |
| 6,446,210 B1 | 9/2002 | Borza |
| 6,456,972 B1 | 9/2002 | Gladstein et al. |
| 6,480,304 B1 | 11/2002 | Os et al. |
| 6,480,825 B1 | 11/2002 | Sharma et al. |
| 6,487,532 B1 | 11/2002 | Schoofs et al. |
| 6,490,549 B1 | 12/2002 | Ulicny et al. |
| 6,496,206 B1 | 12/2002 | Mernyk et al. |
| 6,496,595 B1 | 12/2002 | Puchek et al. |
| 6,501,833 B2 | 12/2002 | Phillips et al. |
| 6,501,966 B1 | 12/2002 | Bareis et al. |
| 6,519,561 B1 | 2/2003 | Farrell et al. |
| 6,519,562 B1 | 2/2003 | Phillips et al. |
| 6,529,885 B1 | 3/2003 | Johnson |
| 6,535,849 B1 | 3/2003 | Pakhomov et al. |
| 6,535,851 B1 | 3/2003 | Fanty et al. |
| 6,560,576 B1 | 5/2003 | Cohen et al. |
| 6,567,778 B1 | 5/2003 | Chao Chang et al. |
| 6,570,964 B1 | 5/2003 | Murveit et al. |
| 6,581,042 B2 | 6/2003 | Pare, Jr. et al. |
| 6,601,027 B1 | 7/2003 | Wright et al. |
| 6,606,594 B1 | 8/2003 | Sejnoha et al. |
| 6,606,598 B1 | 8/2003 | Holthouse et al. |
| 6,629,066 B1 | 9/2003 | Jackson et al. |
| 6,629,075 B1 | 9/2003 | Schalkwyk |
| 6,647,363 B2 | 11/2003 | Claussen |
| 6,665,641 B1 | 12/2003 | Coorman et al. |
| 6,671,672 B1 | 12/2003 | Heck |
| 6,697,947 B1 | 2/2004 | Matyas, Jr. et al. |
| 6,704,703 B2 | 3/2004 | Ferhaoul et al. |
| 6,728,677 B1 | 4/2004 | Kannan et al. |
| 6,732,278 B2 * | 5/2004 | Baird et al. ................. 726/7 |
| 6,742,161 B1 | 5/2004 | James et al. |
| 6,766,295 B1 | 7/2004 | Murveit et al. |
| 6,778,644 B1 | 8/2004 | Jenkins et al. |
| 6,785,365 B2 | 8/2004 | Nguyen |
| 6,785,653 B1 | 8/2004 | White et al. |
| 6,789,062 B1 | 9/2004 | Phillips et al. |
| 6,804,640 B1 | 10/2004 | Weintraub et al. |
| 6,804,647 B1 | 10/2004 | Heck et al. |
| 6,810,404 B1 | 10/2004 | Ferguson et al. |
| 6,819,219 B1 | 11/2004 | Bolle et al. |
| 6,820,094 B1 | 11/2004 | Ferguson et al. |
| 6,839,669 B1 | 1/2005 | Gould et al. |
| 6,856,957 B1 | 2/2005 | Dumoulin |
| 6,859,776 B1 | 2/2005 | Cohen et al. |
| 6,862,570 B2 | 3/2005 | Schalkwyk |
| 6,873,953 B1 | 3/2005 | Lennig |
| 6,885,736 B2 | 4/2005 | Uppaluru |
| 6,886,095 B1 | 4/2005 | Hind et al. |
| 6,907,408 B2 | 6/2005 | Angel |
| 6,912,498 B2 | 6/2005 | Stevens et al. |
| 6,934,858 B2 | 8/2005 | Woodhill |
| 6,944,772 B2 | 9/2005 | Dozortsev |
| 6,959,167 B1 | 10/2005 | Dehandschutter |
| 6,961,704 B1 | 11/2005 | Phillips et al. |
| 6,988,069 B2 | 1/2006 | Phillips |
| 6,993,166 B2 | 1/2006 | Lo et al. |
| 7,003,456 B2 | 2/2006 | Gillick et al. |
| 7,058,573 B1 | 6/2006 | Murveit et al. |
| 7,069,221 B2 | 6/2006 | Crane et al. |
| 7,072,838 B1 | 7/2006 | Ghosh et al. |
| 7,085,840 B2 | 8/2006 | De Jong et al. |
| 7,149,688 B2 | 12/2006 | Schalkwyk |
| 7,171,694 B1 | 1/2007 | Jespersen et al. |
| 7,216,079 B1 | 5/2007 | Barnard et al. |
| 7,240,363 B1 | 7/2007 | Ellingson |
| 7,277,891 B2 | 10/2007 | Howard et al. |
| 7,305,700 B2 | 12/2007 | Boynton et al. |
| 7,319,987 B1 | 1/2008 | Hoffman et al. |
| 7,334,259 B2 | 2/2008 | Haala |
| 7,349,557 B2 | 3/2008 | Tibor |
| 7,352,868 B2 | 4/2008 | Hawkes et al. |
| 7,383,572 B2 | 6/2008 | Rolfe |
| 7,461,258 B2 | 12/2008 | Rolfe |
| 7,522,751 B2 | 4/2009 | White et al. |
| 7,545,961 B2 | 6/2009 | Ahern et al. |
| 7,545,962 B2 | 6/2009 | Peirce et al. |
| 7,571,100 B2 | 8/2009 | Lenir et al. |
| 7,574,734 B2 * | 8/2009 | Fedronic et al. ................. 726/9 |
| 7,580,838 B2 | 8/2009 | Divay et al. |
| 7,584,102 B2 | 9/2009 | Hwang et al. |
| 7,617,522 B2 | 11/2009 | Schmidt et al. |
| 7,634,662 B2 | 12/2009 | Monroe |
| 7,647,498 B2 | 1/2010 | Brown et al. |
| 7,676,439 B2 | 3/2010 | Tattan et al. |
| 7,685,629 B1 | 3/2010 | White et al. |
| 7,689,833 B2 | 3/2010 | Lange |
| 7,690,032 B1 | 3/2010 | Peirce |
| 7,698,322 B1 | 4/2010 | Langley |
| 7,702,918 B2 | 4/2010 | Tattan et al. |
| 7,788,730 B2 | 8/2010 | Dean et al. |
| 7,797,545 B2 | 9/2010 | Adams et al. |
| 7,835,548 B1 | 11/2010 | Langley |
| 7,865,449 B2 | 1/2011 | Tattan et al. |
| 7,865,937 B1 | 1/2011 | White et al. |
| 7,941,380 B2 | 5/2011 | Tattan et al. |
| 7,987,495 B2 | 7/2011 | Maler et al. |
| 7,997,972 B2 | 8/2011 | Nguyen et al. |
| 8,006,291 B2 | 8/2011 | Headley et al. |
| 8,166,297 B2 * | 4/2012 | Headley ................. 713/168 |
| 8,185,646 B2 | 5/2012 | Headley |
| 8,347,370 B2 | 1/2013 | Headley |
| 2002/0023215 A1 | 2/2002 | Wang et al. |
| 2002/0129251 A1 | 9/2002 | Itakura et al. |
| 2002/0152179 A1 | 10/2002 | Racov |
| 2002/0174347 A1 | 11/2002 | Ting |
| 2003/0005326 A1 | 1/2003 | Flemming |
| 2003/0046541 A1 | 3/2003 | Gerdes et al. |
| 2003/0140235 A1 | 7/2003 | Immega et al. |
| 2003/0163739 A1 | 8/2003 | Armington et al. |
| 2003/0236978 A1 | 12/2003 | Evans et al. |
| 2004/0085162 A1 | 5/2004 | Agarwal et al. |
| 2004/0158723 A1 | 8/2004 | Root |
| 2005/0005128 A1 | 1/2005 | Lambert et al. |
| 2005/0091338 A1 | 4/2005 | de la Huerga |
| 2005/0114705 A1 | 5/2005 | Reshef et al. |
| 2005/0267766 A1 | 12/2005 | Galbreath et al. |
| 2005/0268107 A1 | 12/2005 | Harris et al. |
| 2006/0021009 A1 | 1/2006 | Lunt |
| 2006/0041755 A1 | 2/2006 | Pemmaraju |
| 2006/0106734 A1 | 5/2006 | Hoffman et al. |
| 2006/0129821 A1 | 6/2006 | Zugenmaier et al. |
| 2006/0136219 A1 | 6/2006 | Wang |
| 2006/0136744 A1 | 6/2006 | Lange |
| 2006/0184369 A1 | 8/2006 | Levonas |
| 2006/0184431 A1 | 8/2006 | Rosenberg |
| 2006/0212717 A1 | 9/2006 | Ito et al. |
| 2006/0245619 A1 | 11/2006 | Sathath |
| 2007/0055517 A1 | 3/2007 | Spector |
| 2007/0061590 A1 | 3/2007 | Boye et al. |
| 2007/0107016 A1 | 5/2007 | Angel et al. |
| 2007/0107017 A1 | 5/2007 | Angel et al. |
| 2007/0107021 A1 | 5/2007 | Angel et al. |
| 2007/0136573 A1 | 6/2007 | Steinberg |
| 2007/0169182 A1 | 7/2007 | Wolfond et al. |
| 2007/0175986 A1 | 8/2007 | Petrone et al. |
| 2007/0186106 A1 | 8/2007 | Ting et al. |
| 2007/0198435 A1 | 8/2007 | Siegal et al. |
| 2007/0226516 A1 | 9/2007 | Kubota et al. |
| 2007/0226787 A1 | 9/2007 | Maletsky et al. |
| 2007/0297610 A1 | 12/2007 | Chen et al. |
| 2008/0004876 A1 | 1/2008 | He et al. |

| | | | |
|---|---|---|---|
| 2008/0052527 A1 | 2/2008 | Siedlarz | |
| 2008/0059498 A1 | 3/2008 | Carus et al. | |
| 2008/0077405 A1 | 3/2008 | Breuer | |
| 2008/0077406 A1 | 3/2008 | Ganong, III | |
| 2008/0077524 A1 | 3/2008 | Greene | |
| 2008/0077525 A1 | 3/2008 | Willey et al. | |
| 2008/0077526 A1 | 3/2008 | Arumugam | |
| 2008/0086319 A1 | 4/2008 | Berger | |
| 2008/0086764 A1 | 4/2008 | Kulkarni et al. | |
| 2008/0091618 A1 | 4/2008 | Obrea et al. | |
| 2008/0113786 A1 | 5/2008 | Alderucci et al. | |
| 2008/0141353 A1 | 6/2008 | Brown | |
| 2008/0187121 A1 | 8/2008 | Agarwal et al. | |
| 2009/0052745 A2 | 2/2009 | Sathath | |
| 2009/0116703 A1 | 5/2009 | Schultz | |
| 2009/0119299 A1 | 5/2009 | Rhodes | |
| 2009/0164796 A1 | 6/2009 | Peirce | |
| 2009/0259588 A1 | 10/2009 | Lindsay | |
| 2009/0309698 A1 | 12/2009 | Headley et al. | |
| 2009/0313165 A1 | 12/2009 | Walter | |
| 2010/0005296 A1 | 1/2010 | Headley | |
| 2010/0029196 A1 | 2/2010 | Tan | |
| 2010/0036783 A1 | 2/2010 | Rodriguez | |
| 2010/0039218 A1 | 2/2010 | Cohen et al. | |
| 2010/0107230 A1 | 4/2010 | Tyagi et al. | |
| 2010/0115114 A1 | 5/2010 | Headley | |
| 2010/0146604 A1 | 6/2010 | Piccionelli | |
| 2010/0312763 A1 | 12/2010 | Peirce | |
| 2011/0035788 A1 | 2/2011 | White et al. | |
| 2011/0185405 A1 | 7/2011 | Ganesan | |
| 2011/0209200 A2 | 8/2011 | White et al. | |
| 2011/0231911 A1 | 9/2011 | White et al. | |
| 2011/0302644 A1 | 12/2011 | Headley | |
| 2011/0302645 A1 | 12/2011 | Headley | |

FOREIGN PATENT DOCUMENTS

| | | | |
|---|---|---|---|
| EP | 1868131 A1 | 12/2007 | |
| GB | 2379040 A | 2/2003 | |
| WO | 0156352 A2 | 8/2001 | |
| WO | 2009032036 A2 | 3/2009 | |
| WO | 2009127984 A1 | 10/2009 | |
| WO | 2010096628 A2 | 8/2010 | |

OTHER PUBLICATIONS

U.S. Appl. No. 12/942,248, Paul Headley, Methods for Identifying the Guarantor of an Application, filed Nov. 9, 2010.

U.S. Appl. No. 13/211,230, Paul Headley, Methods for the Secure Use of One-Time Passwords, filed Aug. 11, 2011.

U.S. Appl. No. 13/422,232, Paul Headley, User Authentication, filed Apr. 9, 2012.

U.S. Appl. No. 13/213,035, Paul Headley, Multi-Channel Multi-Factor Authentication, filed Aug. 18, 2011.

U.S. Appl. No. 13/469,568, Paul Headley, Methods for Thwarting Man-In-The-Middle Authentication Hacking, filed May 11, 2012.

International Search Report and Written Opinion, PCT/US09/48842 (Jun. 26, 2009), dated Aug. 3, 2009.

Vince Thomas et al., "Learning to Predict Gender from Iris Images," First IEEE International Conference on Biometrics: Theory, Applications, and Systems, Sep. 2007.

Ambalakat, Security of Biometric Authentication Systems, 2005, http://www.ewp.rpl.edu/hartford/~rhb/cs_seminar_2005/SessionA1/ambalakat.pdf.

Chenafa, M. et al., Biometric System Based on Voice Recognition Using Multiclassifiers, "Biometrics and Identity Management," Springer Berlin, pp. 206-215, May 5, 2008.

Tan, T. G., "Phishing Redefined—Preventing Man-in-the-Middle Attacks for Web-based Transactions," http://www.dssasia.com, Mar. 2005.

EP09774182.1, Extended European Search Report, dated Aug. 6, 2013.

* cited by examiner

SYSTEMS AND METHODS FOR CONTROLLING ACCESS TO ENCRYPTED DATA STORED ON A MOBILE DEVICE

CROSS-REFERENCE TO RELATED APPLICATIONS

This application is a continuation of U.S. patent application Ser. No. 12/166,792 filed Jul. 2, 2008 now U.S. Pat. No. 8,166,297 and also entitled "Systems and Methods for Controlling Access to Encrypted Data Stored on a Mobile Device." This application is related to U.S. patent application Ser. No. 12/119,617 filed May 13, 2008 and entitled "Multi-Channel Multi-Factor Authentication," now U.S. Pat. No. 8,006,291, and also related to U.S. patent application Ser. No. 12/137,129 filed Jun. 11, 2008 and entitled "Single-Channel Multi-Factor Authentication," both of which are incorporated herein by reference.

BACKGROUND OF THE INVENTION

1. Field of the Invention

The present invention relates generally to the field of authentication and more particularly to accessing secured data on mobile devices.

2. Description of the Prior Art

Portable devices, such as laptop computers, are commonly used to transport confidential data through public places. Unfortunately, such devices are susceptible to being lost, stolen, or accessed by unauthorized individuals, for example. This can lead to such problems as the public disclosure of the confidential data, identity theft, the loss of trade secrets to competitors, as well as financial liability and damage to a brand's image in the marketplace.

One common approach to securing confidential data on mobile devices is the use of encryption. Encrypted data requires a key to be decrypted. However, in order to permit a user of the mobile device to access the confidential data at will, the key is stored on the mobile device, typically protected by a password. A smart criminal or a professional crime organization, for instance, can break such password protections and access first the key and then the data.

SUMMARY

An exemplary method for accessing encrypted data with a mobile device comprises prearranging a response to a prompt, obtaining a decryption key from an access control system, and using the decryption key to decrypt the encrypted data with the mobile device. The response can be a biometric response in some instances. Obtaining the decryption key from the access control system, in turn, includes receiving the prompt over a first communication channel from the access control system, providing the response to the access control system, and receiving by the mobile device the decryption key from the access control system. In various embodiments, prearranging the response to the prompt includes establishing a password or a biometric response, for example, as the response. The prompt can comprise a personalized prompt, and can be one of a plurality of prompts in some embodiments. In various embodiments, the response to the access control system is provided over the first communication channel or over a second communication channel. In some embodiments, obtaining the decryption key further includes receiving a prompt for a claimant target and submitting the claimant target.

An exemplary method for controlling access to encrypted data stored on a mobile device comprises sending a prompt to the mobile device over a first communication channel, receiving a claimant response to the prompt, determining a match between the claimant response and a response template associated with the prompt, and sending the decryption key to the mobile device. The claimant response can be a biometric response, for example. In some embodiments the method further comprises storing the response template in association with the prompt. The method can further comprise determining a permission for the user. In various embodiments the method further comprises receiving a request for the decryption key from the mobile device before sending the prompt to the mobile device, and in some of these embodiments the request includes an identification of the mobile device and/or a claimant target. In those embodiments in which the request includes an identification of the mobile device, the method may further comprise determining a permission for the mobile device. In some embodiments, the claimant response to the prompt is received over the first communication channel or over a second communication channel. The method may further comprise sending a prompt for a claimant target and receiving the claimant target, in some instances.

Systems comprising a computing system are also provided. An exemplary computing system includes logic programmed to send a prompt over a first communication channel, receive a claimant response to the prompt, determine a match between the claimant response and a response template associated with the prompt, and send the decryption key. The logic may be further programmed, in various embodiments, to select a prompt from a plurality of prompts, to store the response template in association with the prompt, and/or to determine a permission for the user and/or the mobile device.

DETAILED DESCRIPTION

The present disclosure is directed to systems and methods that protect encrypted data on mobile devices by storing a decryption key remotely from the mobile device. In order to decrypt the encrypted data on the mobile device, the mobile device obtains the decryption key from a remote site, such as a remote server. The remote server can control access to the encrypted data by controlling access to the decryption key. For example, the server can implement user authentication as a condition for providing the decryption key so that only authorized individuals can access the encrypted data. Access to the encrypted data can also be controlled by withholding the decryption key where, for instance, a mobile device has been reported to be lost or stolen, or once an individual's access privilege has been revoked, or at certain times of the day.

Figure 1:
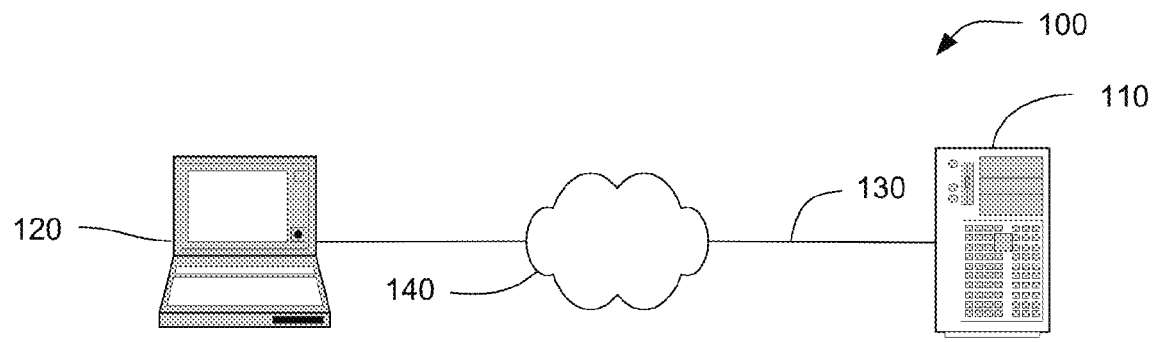
FIG. 1 shows an exemplary environment including a mobile device and an access control unit according to various embodiments of the invention.

FIG. 1 shows an exemplary environment 100 for carrying out various methods described herein. The environment 100 comprises an access control system 110 in communication with a mobile device 120 over a communication channel 130. The access control system 110 can comprise a computing system such as one or more servers, data storage devices, workstations, and the like, networked together and configured to perform the functions described herein. The access control system 110 is preferably implemented in a secure environment to prevent both external and internal tampering. The access control system 110 is configured to control access to encrypted data on mobile devices 120, described in more detail with respect to FIG. 4, and in some embodiments the access control system 110 is also configured to implement an initial setup or enrollment step. Alternatively, this initial setup can be implemented by a separate system in communication with the access control system 110.

The mobile device 120 can comprise, for example, at laptop computer (as shown in FIG. 1), a personal digital assistant (PDA), a cell phone, or a smart phone such as a Treo or a BlackBerry. The mobile device 120 includes memory for storing encrypted data. Such memory can comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing digital or analog information.

The communication channel 130 can be fully duplexed and can comprise connections made through one or more networks 140 such as the public switched telephone network (PSTN), wireless telephone networks, the Internet, wide area networks (WANs), and a local area networks (LANs).

Figure 2:
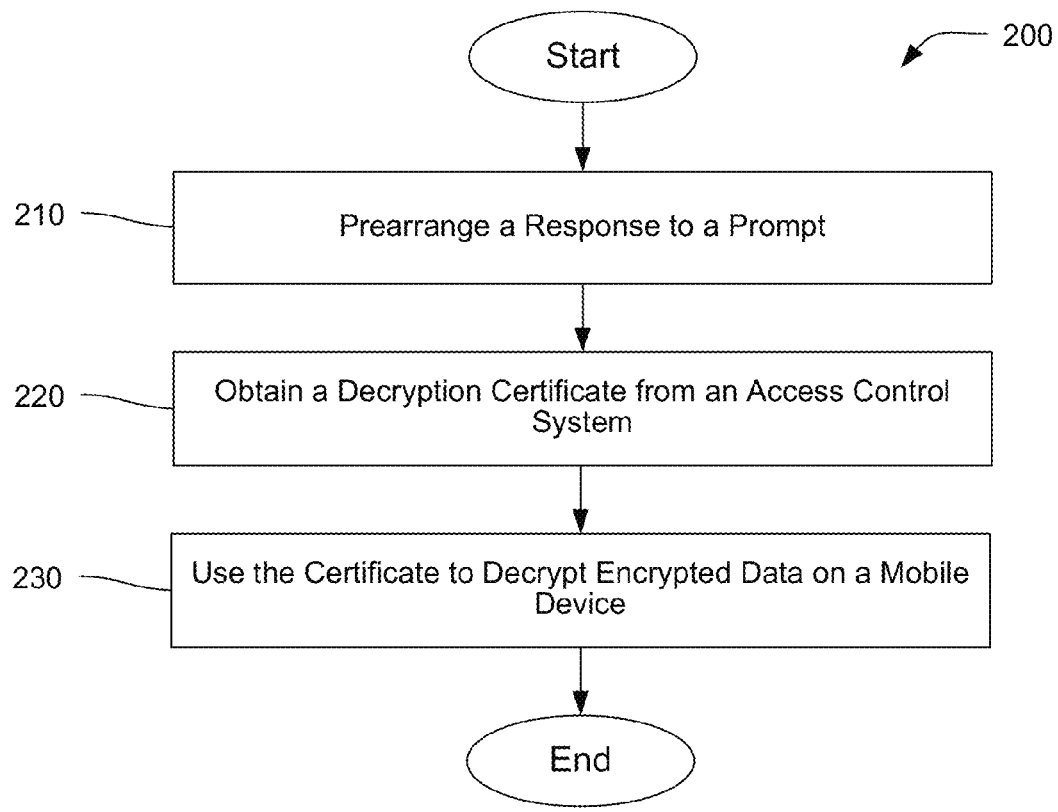
FIG. 2 illustrates an exemplary method for accessing encrypted data with a mobile device according to various embodiments of the invention.

FIG. 2 illustrates an exemplary method 200 for accessing encrypted data with the mobile device 120. The method 200 includes steps that a user, for example, can perform to gain access to the encrypted data. The method 200 comprises a step 210 of prearranging a response to a prompt, a step 220 of obtaining a decryption key from an access control system 110, and a step 230 of using the decryption key to decrypt the encrypted data with the mobile device 120.

Step 210 of the method 200 can constitute part of an initial setup or enrollment process and can occur any time in advance of step 220. As a simple example, where the prompt is a request for a user name or password, prearranging a response to the prompt in step 210 can include establishing, such as by selecting or being assigned, a unique user name or password as the response. In some embodiments, step 210 comprises prearranging a biometric response to the prompt. Thus, for example, step 210 can comprise receiving a prompt and providing the biometric response such as by speaking into a microphone or video camera, writing on a touch-sensitive pad, placing a finger on a fingerprint reader, and so forth. As noted, step 210 can be part of an enrollment process such as described in U.S. patent application Ser. Nos. 12/119,617 and 12/137,129 noted above. In such an enrollment process, an enrollee can select one or more predefined prompts and provide a response to each. In some embodiments, one or more of the prompts can be a personalized prompt created by the enrollee.

Figure 3:
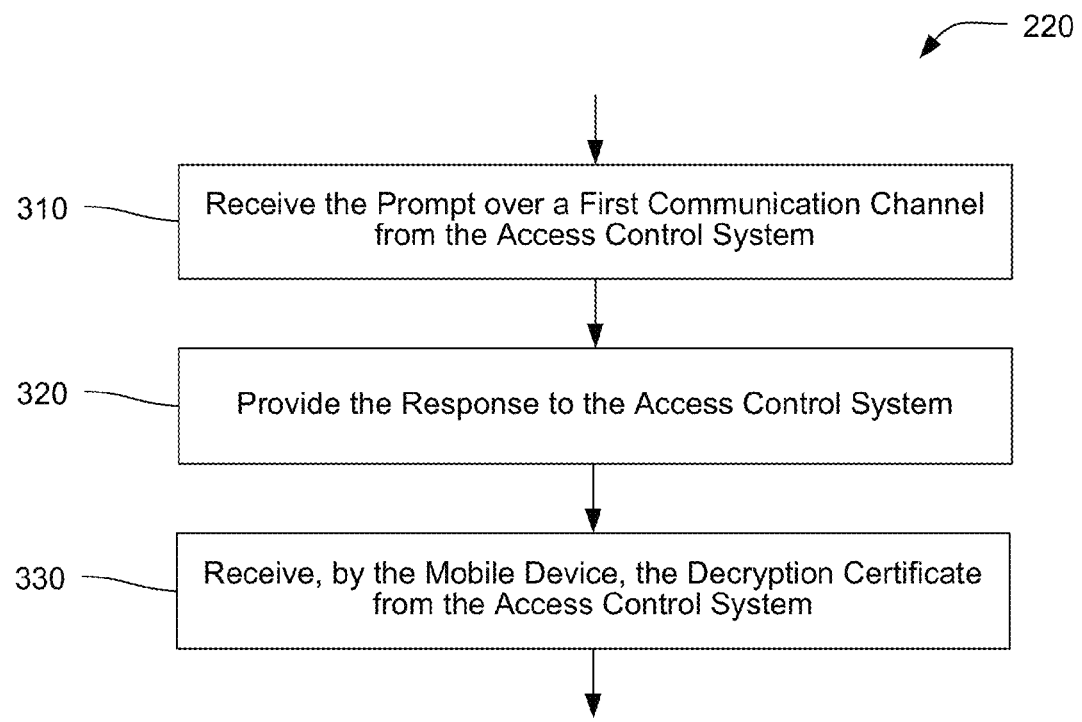
FIG. 3 illustrates an exemplary method for obtaining a decryption key from an access control system according to various embodiments of the invention.

Step 220 of obtaining a decryption key from an access control system is described more fully with respect to FIG. 3. As illustrated by FIG. 3, step 220 comprises a step 310 of receiving the prompt over a first communication channel from the access control system, a step 320 of providing the response to the access control system, and a step 330 of receiving by the mobile device 120 the decryption key from the access control system.

In some instances, step 220 is initiated by an attempt to access encrypted data. For example, a software application attempting to open a file including encrypted data requests the decryption key from the access control system 110. Applications that are configured to request a decryption key when presented with encrypted data are sometimes referred to as "encryption-aware." The request can include, for example, a claimant target for the user of the mobile device 120 and/or a device identification specific to the mobile device, and/or an identification of the encrypted file. Based on the request, the access control system 110 determines an appropriate prompt for which a response was prearranged in step 210.

Next, in step 310, the user of the mobile device 120 receives the prompt over a first communication channel 130 from the access control system 110. In response, the user of the mobile device 120 in step 320 provides the response to the access control system 110. The response to the access control system 110, in some embodiments, is also provided over the first communication channel, while in other embodiments the response is instead provided over a second communication channel. Thus, as one example, the prompt can be received over the first communication channel by the mobile device 120 and the response provided over the same communication channel back to the access control system 110. As another example, the prompt can be received on a cell phone belonging to the user of the mobile device 120 and the response provided either from the cell phone or from the mobile device 120 back to the access control system 110.

Once the access control system 110 receives the response, the access control system 110 determines whether to allow access to the encrypted data. If so, the access control system 110 sends the decryption key and in step 330 the mobile device 120 receives the decryption key. In some embodiments, a digital certificate including the decryption key can be sent by the access control system 110. Thereafter, in step 230 (FIG. 2) the mobile device 120 uses the decryption key to decrypt the encrypted data.

Figure 4:
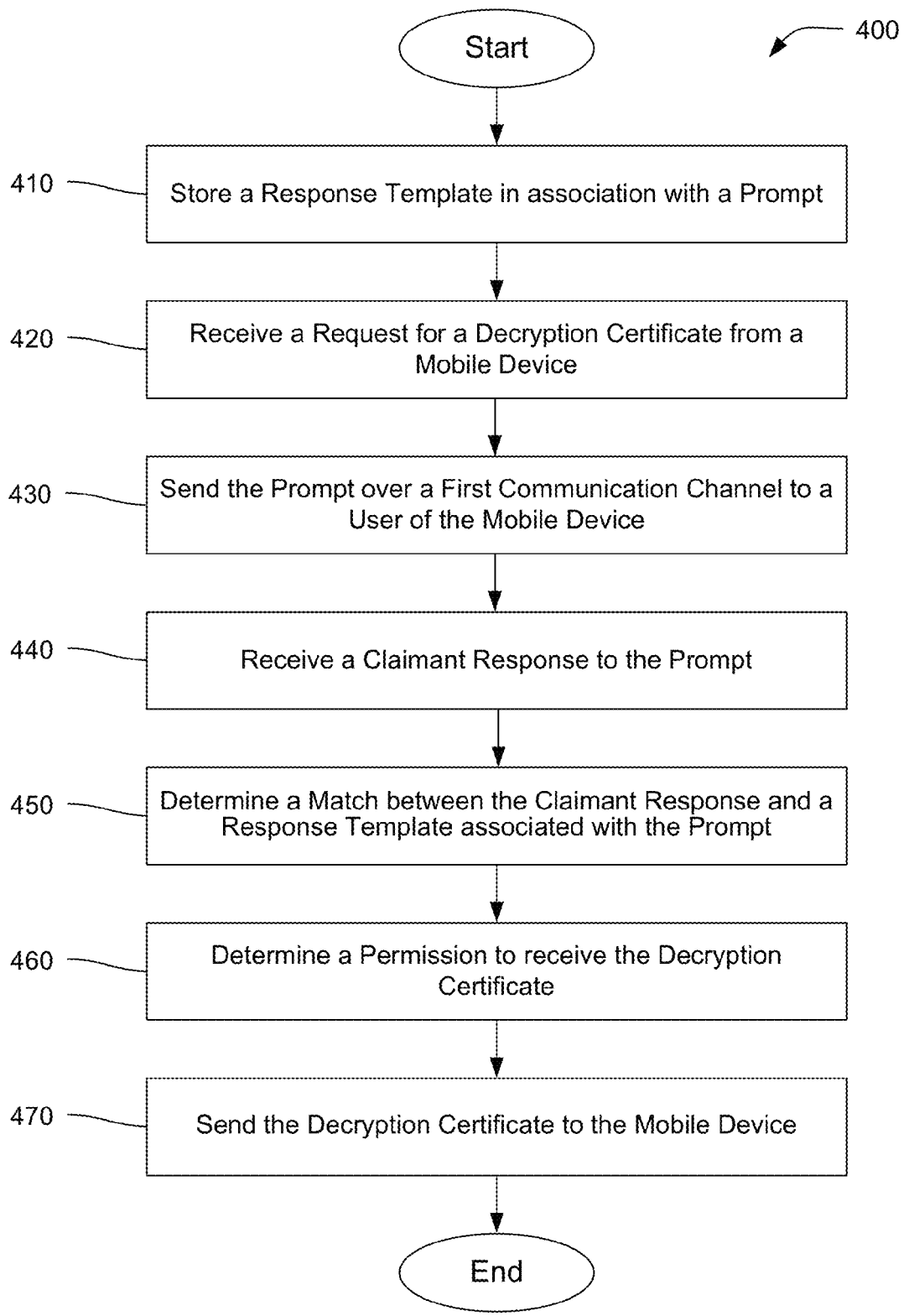
FIG. 4 illustrates an exemplary method for controlling access to encrypted data on a mobile device according to various embodiments of the invention.

FIG. 4 illustrates an exemplary method 400 for controlling access to encrypted data on the mobile device 120. The method 400 includes steps that can be performed by the access control system 110, for example. The method 400 can begin, in some embodiments, with an optional step 410 of storing a response template in association with a prompt. In some of these embodiments, the response template and prompt are further associated with some identifier that allows the prompt to be subsequently retrieved. Examples of such identifiers include a user ID, a claimant target, a device identification for the mobile device 120, and an identification of an encrypted data file. In some embodiments, the step 410 is performed by the access control system 110. In some other embodiments, the step 410 is performed by another system that can communicate the prompt and response template to the access control system 110.

It will be appreciated that step 410 can be related to step 210 of method 200 in that the access control system 110 in step 410 stores the response template in association with the prompt when the user in step 210 prearranges the response to the prompt. Where the prompt is a request for a password, for example, the response and the response template can be the same, such as an alphanumeric string.

On the other hand, where biometrics are involved, the response template can be something derived from the response. For instance, where the prompt constitutes a cue for a verbal answer, the response is the audio data of the user giving the verbal answer, and the response template is something that is derived from the audio data of the verbal answer. For example, in step 210 the user prearranges a response to the prompt, "What is your favorite color?" by saying the response "blue" into a microphone of a PC connected to the access control system 110. The access control system 110 in step 410 receives the audio data of the user saying "blue," creates a response template from the audio data, for example, by applying one or more filters to the audio data, and then stores the response template in association with the prompt.

In an optional step 420, a request for a decryption key is received by the access control system 110 from a mobile device 120. The request can include information from which the access control system 110 can determine a prompt. Such information can include, for example, an identification of the encrypted data file, a user ID, a claimant target, and/or an identification of the mobile device. It will be understood from step 420 that step 220 of the method 200, shown in FIG. 3, can optionally include a step of sending the request to the access control system 110 before the step 310 of receiving the prompt.

In a step 430, the prompt is sent over a first communication channel to the user of the mobile device. Step 430, in some embodiments, includes selecting the prompt based on the information in the request. Where the information specifies an identification of an encrypted data file, for instance, the access control system 110 can retrieve a prompt that was stored in association with that identification. Similarly, where the information specifies an identification of the mobile device, the access control system 110 can retrieve a prompt that was stored in association with the mobile device. In some embodiments, the additional information in the request correlates to a record including a plurality of prompts. In these embodiments, the step 430 can further comprise selecting the prompt to be sent from the plurality of prompts as disclosed in more detail in U.S. patent application Ser. Nos. 12/119,617 and 12/137,129 noted above.

It will be appreciated that in step 430 the prompt is sent over the first communication channel to the user of the mobile device, but not necessarily to the mobile device itself. While the first communication channel can be an Internet channel to the mobile device, the prompt can be sent instead over a wireless telephone channel to the user's cell phone.

Next, in step 440 the access control system 110 receives from the user a claimant response to the prompt. It will be appreciated that step 440 can be related to step 320 of step 220 (FIG. 3) in that the response that the mobile device 120 provides to the access control system 110 in step 320 is the claimant response that is received by the access control system 110 in step 440. The claimant response can be received, in some embodiments, over the same, or a different, communication channel as the communication channel used to send the prompt in step 430.

In step 450 a match is determined between the claimant response and a response template associated with the prompt. Determining whether or not a match exists between responses and templates is discussed in greater detail in U.S. patent applications Ser. Nos. 12/119,617 and 12/137,129 noted above. If no match is found, the method 400 can terminate, though in some embodiments the method 400 repeats, beginning at step 430 with the same or a different prompt. Determining that the match exists signifies that the individual that provided the response to the prompt also was the same individual that prearranged the response to the prompt in method 200. In other words, determining the match serves to authenticate the user.

Provided that a match is found, method 400 can continue with the optional step 460 of determining a permission to receive the decryption key. For example, flags can be used to indicate the presence or absence of permissions that are associated with such things as the user, the mobile device 120, or the encrypted data. As used herein, "determining a permission" encompasses both making a determination that an entity (user, mobile device 120, encrypted data file, etc.) positively has a permission, as well as making a determination that an entity lacks a permission.

In a situation where a mobile device 120 has been reported to be stolen, for instance, a flag can be set for the device identification of the reportedly stolen mobile device 120 to signify that the particular mobile device 120 does not have a permission to receive decryption keys. Here, all authenticated individuals can be prevented from accessing encrypted data on a particular mobile device 120 when the security of that mobile device 120 has been called into question. Likewise, a flag can be set for a user ID to signify that a particular user does not have a permission to receive any decryption keys. In this way a particular authenticated individual can be prevented from having access to all encrypted data on any mobile device 120 that the individual may previously have had access to. As another example, after a certain date or a span of elapsed time, a flag can be changed to remove a permission to access a particular encrypted file. Here, all authenticated individuals can be prevented from accessing particular encrypted data on any mobile device 120 when the data has become out-of-date, for instance. It will be further understood that like methods can be employed to allow particular authenticated individuals to have access to some encrypted data on a mobile device 120 while preventing access to other encrypted data.

Provided that a match was found in step 450, and that access was not blocked in step 460, then in step 470 the decryption key is sent to the mobile device 120. Step 470 can be related to step 330 of step 220 (FIG. 3) in that the decryption key sent to the mobile device 120 in step 470 is the decryption key received by the mobile device 120 in step 330.

The access control system 110 comprises logic programmed to perform steps of the methods described herein. Such logic can comprise hardware, firmware, software stored on a computer readable medium, or combinations thereof. Logic may include a computing system such as an integrated circuit, a microprocessor, a personal computer, server, distributed computing system, communication device, network device, or the like. For example, logic can be implemented by separate software modules executed on a common server. In other embodiments, logic can be implemented on different computing systems. Logic can also be at least partially integrated together.

The access control system 110 can also comprise, as part of the logic or separate therefrom, volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing digital or analog information. The logic can also comprise communications logic that allows the access control system 110 to communicate, for example, with the mobile device 120. In some embodiments the communications logic allows the access control system 110 to interface with multiple mobile devices in parallel.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for accessing encrypted data with a mobile device, the method comprising:
   prearranging a response to a prompt;
   obtaining a decryption key from an access control system
      including receiving the prompt over a first communication channel from the access control system,
      providing the response to the access control system, and
      receiving by the mobile device the decryption key from the access control system; and
   using the decryption key to decrypt the encrypted data with the mobile device.

2. The method of claim 1 wherein prearranging the response to the prompt includes establishing a password as the response.

3. The method of claim 1 wherein prearranging the response to the prompt includes establishing a biometric response as the response.

4. The method of claim 1 wherein the prompt comprises a personalized prompt.

5. The method of claim 1 wherein the prompt is one of a plurality of prompts.

6. The method of claim 1 wherein the response to the access control system is provided over the first communication channel.

7. The method of claim 1 wherein the response to the access control system is provided over a second communication channel.

8. The method of claim 1 wherein the response is a biometric response.

9. A method for controlling access to encrypted data stored on a mobile device, the method comprising:
   sending a prompt to the mobile device over a first communication channel;
   receiving a claimant response to the prompt;
   determining a match between the claimant response and a response template associated with the prompt; and
   sending the decryption key to the mobile device.

10. The method of claim 9 further comprising storing the response template in association with the prompt.

11. The method of claim 9 further comprising receiving a request for the decryption key from the mobile device before sending the prompt to the mobile device.

12. The method of claim 11 wherein the request includes an identification of the mobile device.

13. The method of claim 12 further comprising determining a permission for the mobile device.

14. The method of claim 9 further comprising determining a permission for the user.

15. The method of claim 9 wherein the claimant response to the prompt is received over the first communication channel.

16. The method of claim 9 wherein the claimant response to the prompt is received over a second communication channel.

17. The method of claim 9 wherein the claimant response is a biometric response.

18. A system comprising:
    a computing system including logic including a microprocessor and programmed to
       send a prompt over a first communication channel;
       receive a claimant response to the prompt;
       determine a match between the claimant response and a response template associated with the prompt; and
       send the decryption key.

19. The system of claim 18 wherein the computing system includes logic further programmed to select a prompt from a plurality of prompts.

20. The system of claim 18 wherein the computing system includes logic further programmed to store the response template in association with the prompt.

21. The system of claim 18 wherein the computing system includes logic further programmed to determine a permission for the user.

22. The system of claim 18 wherein the computing system includes logic further programmed to determine a permission for the mobile device.

23. The method of claim 9 wherein sending the decryption key to the mobile device is performed in response to determining the match.

* * * * *